Jan. 8, 1957 S. O. SAROSSY 2,776,616
GARLIC PRESS
Filed April 28, 1954
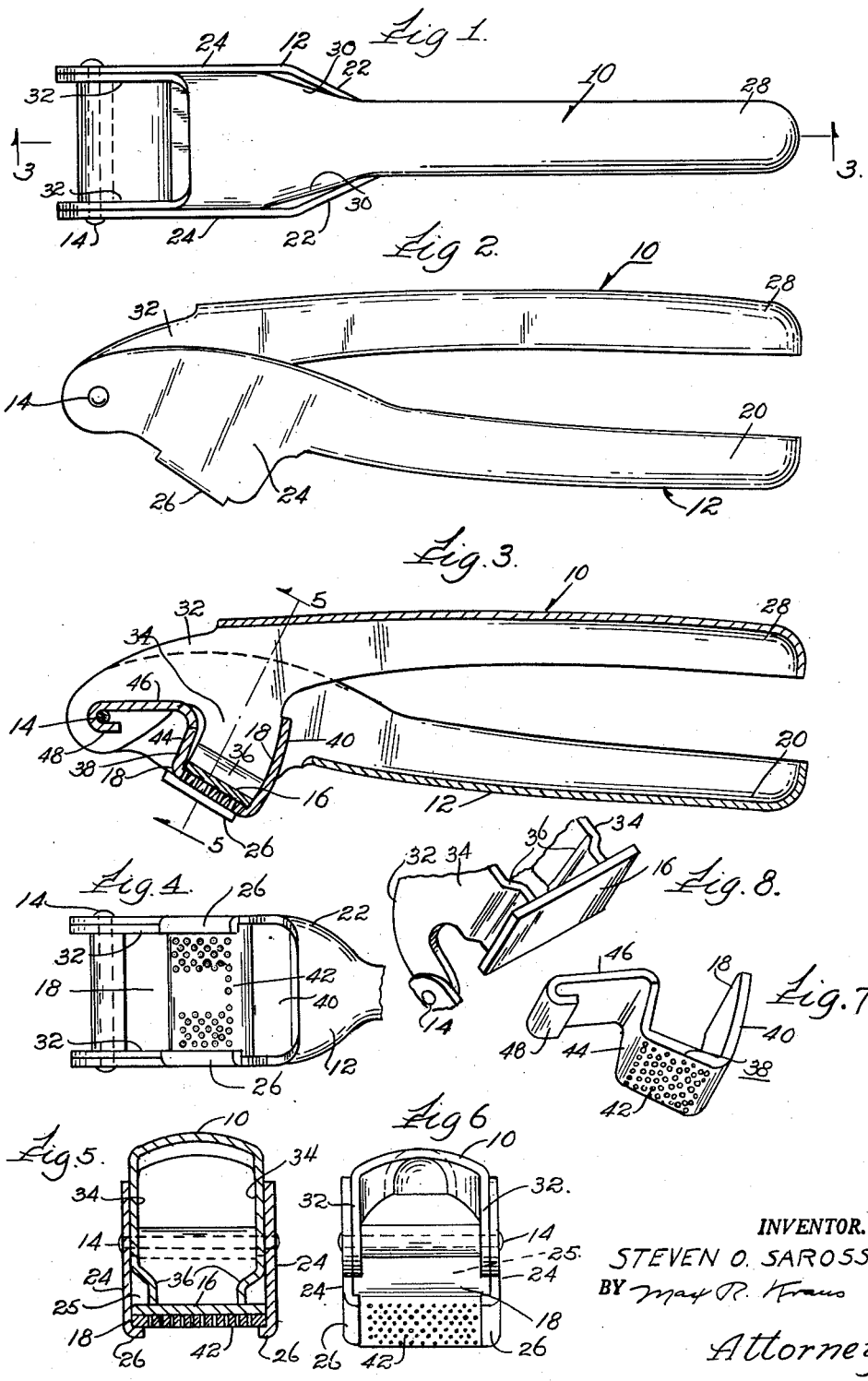
INVENTOR.
STEVEN O. SAROSSY
BY May R. Kraus
Attorney.

United States Patent Office 2,776,616
Patented Jan. 8, 1957

2,776,616
GARLIC PRESS
Steven O. Sarossy, Melrose Park, Ill.
Application April 28, 1954, Serial No. 426,178
3 Claims. (Cl. 100—234)

This invention relates to a garlic press.

One of the objects of this invention is to provide an improved garlic press with a removable strainer in which the parts may be readily cleaned and kept in a sanitary condition.

Another object of this invention is to provide an improved garlic press with a removable strainer which strainer has no side walls and when removed may be readily cleaned and washed.

Another object of this invention is to provide a garlic press with a removable strainer which has no side walls, but which utilizes the side walls of one of the levers to provide a strainer compartment for the garlic to be squeezed, thereby providing a strainer from which the contents may be readily removed and cleaned.

Another object is to provide a very simple and inexpensive construction.

Other objects will become apparent as this description progresses.

In the drawings:

Figure 1 is a top plan view of the device.

Figure 2 is a side elevational view.

Figure 3 is a cross sectional view taken on lines 3—3 of Fig. 2.

Figure 4 is a bottom plan view.

Figure 5 is a cross sectional view taken on lines 5—5 of Fig. 3.

Figure 6 is an end elevational view.

Figure 7 is a perspective view of the strainer and

Figure 8 is a perspective view of a portion of the upper lever showing the press member.

The device includes a pair of levers or jaws generally indicated by the numerals 10 and 12 which are pivotally joined together at their forward ends by a bolt or pin 14. The upper lever 10 carries the presser or squeezer element 16 and the lower lever removably supports the perforated strainer 18 in which the garlic is placed.

Each of the levers 10 and 12 is formed as an integral unit and will now be described in detail. The lower lever 12 has a concave shaped handle portion 20 which tapers outwardly as at 22 and projects forwardly to form a pair of side walls 24 of generally triangular shape in side elevation. An inwardly turned short flange 26 is formed on the bottom of each of the side walls 24. The space between the side walls 24 is open to receive the removable strainer 18, a portion of which rests on the flanges 26.

The upper lever 10 had a handle portion 28 shaped similarly to handle 20. The handle portion 28 tapers outwardly as at 30 and extends forwardly to provide a pair of ears 32 which are positioned inside adjacent the side walls 24. The bolt or pin 14 extends through suitable openings in the side walls 24 of the lower lever and the ears 32 of the upper lever to pivotally join the two levers together. The bolt is anchored to the side walls 24. The upper lever 10 adjacent the ears 32 has a pair of side extensions 34 which are offset inwardly as at 36 and which support a flat presser or squeezer plate member indicated at 16. The plane of the plate 16 is positioned at an angle to the longitudinal axis of the lever 10 so that as it enters the top of the strainer cup it will cover the top of the strainer cup to prevent any garlic or other product in the strainer from being pushed out of the top of the strainer.

The detachable strainer generally indicated by the numeral 18 comprises a substantially U-shaped body 38 having a slightly curved rear end wall 40, a perforated bottom 42 and a shorter front end wall 44 which continues forwardly and downwardly at an inclined angle to form an apron 46 and is curved inwardly to form a hook portion 48. The apron 46 and hook 48 is narrower than the width of the body 38 to compensate for the ears 32 of the upper lever.

The strainer 18 is positioned between the walls 24 of the lower lever 12 and the hook 48 of same is secured to the pivot pin 14. The bottom 42 of the strainer rests on the flanges 26. The strainer has no side walls but when positioned in the lower lever the side walls 24 of the lever form the side walls of the strainer compartment generally indicated at 25. The strainer may be readily removed from the lower lever merely by sliding it forwardly to unhook after which it is lifted upwardly.

When the garlic or other product to be squeezed is placed in the strainer compartment it will be confined therein and when the upper lever 10 is moved towards the lower lever 12 the presser plate 16 enters the top of the strainer compartment at an angle on the same angular plane as the angle of the apron portion 46 of the strainer and covers the top of the strainer compartment so that the contents in the strainer compartment are not pushed up out of the strainer and as the upper lever is moved downwardly the contents in the strainer compartment are trapped therein and squeezed with the juices running out of the perforations 42. To clean the strainer, it is removed from the lower lever and the contents are readily dumped out of the strainer. Since the removed strainer has no end walls, it is easy to clean same.

It will be understood various changes and modifications may be made from the foregoing without departing from the spirit and scope of the appended claims.

I claim:

1. A hand held garlic press comprising, a pair of levers having substantially straight handle portions both adapted to be held in the hand, said levers being pivotally connected at one end by a cross pin, one of said levers having a pair of depending side extensions and a flat presser secured to the bottom of said side extensions and extending therebetween and providing open spaces forwardly and rearwardly of said side extensions, the other of said levers having a pair of side walls and an open bottom, a removable strainer removably positioned in said other lever, said strainer having a receptacle with open sides adapted to be closed by said side walls to receive the material to be pressed, said receptacle having a perforated bottom and a hook adapted to removably engage said cross pin.

2. A hand held garlic press comprising, a pair of levers having substantially straight handle portions both adapted to be held in the hand, said levers being pivotally connected at one end by a cross pin, one of said levers having a pair of depending side extensions and a flat presser secured to the bottom of said side extensions and extending therebetween and providing open spaces forwardly and rearwardly of said side extensions, the other of said levers having a pair of side walls and an open bottom, a removable strainer having a substantially U-shaped body in longitudinal cross section open at the sides thereof and adapted to be positioned between said pair of side walls, said U-shaped body having a perforated bottom portion adapted to overlie said open bottom, and a hook carried by said U-shaped body for detachable engagement with said cross pin.

3. A hand held garlic press comprising, a pair of levers having substantially straight handle portions both adapted to be held in the hand, said levers being pivotally connected at one end by a cross pin, one of said levers having a pair of depending side extensions and a flat planar presser secured to the bottom of said side extensions and extending therebetween and providing open spaces forwardly and rearwardly of said side extensions, the plane of said presser being at an angle to the longitudinal axis of said one lever, the other of said levers having a pair of side walls and an open bottom, a removable strainer having a body portion of substantially U-shape in longitudinal cross section open at the sides thereof and adapted to be positioned between said pair of side walls, said body portion having a perforated bottom, and an apron on said strainer provided with a hook for detachable engagement with said cross pin.

References Cited in the file of this patent

UNITED STATES PATENTS

| | | |
|---|---|---|
| 509,221 | Heath | Sept. 21, 1897 |
| 1,938,463 | Roberts | Dec. 5, 1933 |
| 1,987,302 | Majewski | Jan. 8, 1935 |
| 2,117,687 | Stanton | May 17, 1938 |
| 2,518,650 | Van Dusen | Aug. 15, 1950 |

FOREIGN PATENTS

| | | |
|---|---|---|
| 10,438 | Great Britain | 1887 |